(12) United States Patent
Wang

(10) Patent No.: US 9,937,894 B2
(45) Date of Patent: Apr. 10, 2018

(54) SEAT BELT RETRACTOR HAVING DETECTION DEVICE

(71) Applicant: Liang-Hsiung Wang, Tainan (TW)

(72) Inventor: Liang-Hsiung Wang, Tainan (TW)

(*) Notice: Subject to any disclaimer, the term of this patent is extended or adjusted under 35 U.S.C. 154(b) by 198 days.

(21) Appl. No.: 14/952,736

(22) Filed: Nov. 25, 2015

(65) Prior Publication Data

US 2016/0368453 A1 Dec. 22, 2016

(30) Foreign Application Priority Data

Jun. 17, 2015 (TW) .............................. 104209716 U

(51) Int. Cl.
*B60R 22/48* (2006.01)

(52) U.S. Cl.
CPC ...... *B60R 22/48* (2013.01); *B60R 2022/4825* (2013.01); *B60R 2022/4866* (2013.01)

(58) Field of Classification Search
CPC ............ B60R 22/48; B60R 2022/4825; B60R 2022/4866
See application file for complete search history.

(56) References Cited

U.S. PATENT DOCUMENTS

| | | | | | |
|---|---|---|---|---|---|
| 3,519,771 | A | * | 7/1970 | Burns | B60R 22/48 200/61.16 |
| 3,665,385 | A | * | 5/1972 | Booth | B60R 22/48 200/61.12 |
| 3,797,603 | A | * | 3/1974 | Loomba | B60R 22/343 180/268 |
| 3,913,860 | A | * | 10/1975 | Takada | B60R 22/343 180/270 |

\* cited by examiner

*Primary Examiner* — Sang K Kim
(74) *Attorney, Agent, or Firm* — Hershkovitz & Associates, PLLC; Abe Hershkovitz

(57) ABSTRACT

A seat belt retractor has a frame, a retracting device and a detection device. The retracting device is mounted on the frame and has a spool and a webbing body. The spool is pivotally connected to the frame. The webbing body is wound on the spool and forms multiple webbing layers around the spool. The detection device is mounted on the frame and has a detecting rod. The detecting rod is restorable, abuts an outermost webbing layer around the spool, and produces a displacement according to the variation in quantity of the webbing layers. The detection device of the seat belt retractor can directly detect a pulled length of the webbing body to know whether the user fastens the seat belt. The seat belt retractor can effectively remind a user to fasten the seat belt.

2 Claims, 16 Drawing Sheets

SEAT BELT RETRACTOR HAVING DETECTION DEVICE

BACKGROUND OF THE INVENTION

1. Field of the Invention

The invention relates to a seat belt retractor, and more particularly to a seat belt retractor that has a detection device to detect whether a webbing body of the seat belt is pulled out or not.

2. Description of Related Art

Every occupant in a vehicle is required to fasten a seat belt for safety. The conventional seat belt has a buckle assembly, a webbing body, a tongue, and a detection device. The tongue is mounted on the webbing body and is selectively locked into the buckle assembly. The detection device is mounted on the buckle assembly to detect whether the tongue is locked or not. If the tongue is not locked into the buckle assembly, the detection device sends a signal to a controller of the vehicle, and then a light or a sound generated by the vehicle reminds the occupants in the vehicle to fasten the seat belt.

Some drivers and passengers, as a matter of convenience, use an auxiliary tongue for inserting into the buckle assembly. Though the drivers and passengers do not actually fasten the seat belts, the detection device does not send the signal to the controller of the vehicle. Therefore, the reminding function of the detection device mounted on the buckle assembly is not effectively performed.

To overcome the shortcomings, the present invention provides a seat belt retractor having a detection device to obviate the aforementioned problems.

SUMMARY OF THE INVENTION

The objective of the invention is to provide a seat belt retractor to resolve the drawbacks of the conventional detection device.

The seat belt retractor has a frame, a retracting device and a detection device. The retracting device is transversally mounted on the frame and has a spool and a webbing body. The spool is pivotally connected to the frame. The webbing body is wound on the spool and forms multiple webbing layers around the spool. The detection device is mounted on the frame and has a detecting rod. The detecting rod is restorable, abuts an outermost webbing layer around the spool, and produces a displacement according to the variation in quantity of the webbing layers.

If a user does not fasten a seat belt, the webbing body is not pulled out and the pulled length of the webbing body does not reduce. The detecting rod does not produce displacement. The detection device sends a signal to the controller of the vehicle. Then, a light or a sound generated by the vehicle can remind the user to fasten the seat belt. If the user can pull out certain length of the webbing body of a seat belt and the layer number of the webbing layers is reduced adequately. The detecting rod still abuts the outermost webbing layer around the spool and produces adequate displacement accordingly. The detection device sends another signal to a controller of a vehicle that detecting rod has displacement. The controller is aware the user has fastened the seat belt. The light or the sound generated by the vehicle can be stopped.

Therefore, the detection device of the seat belt retractor can directly detect a pulled length of the webbing body to know whether the user actually fastens the seat belt or not. The seat belt retractor can effectively remind the user to fasten the seat belt.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
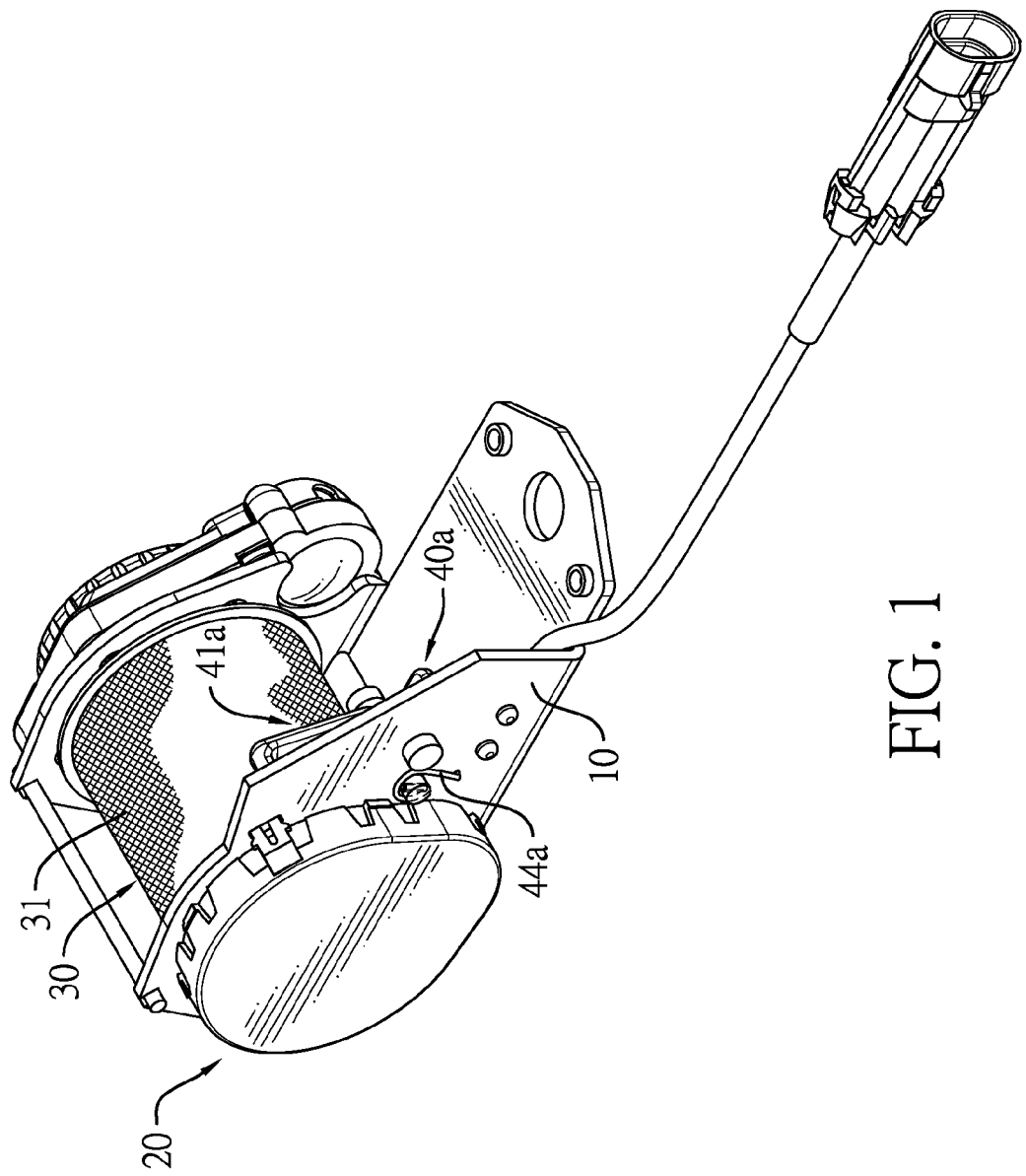
FIG. 1 is a perspective view of a first embodiment of a seat belt retractor in accordance with the present invention.
Figure 2:
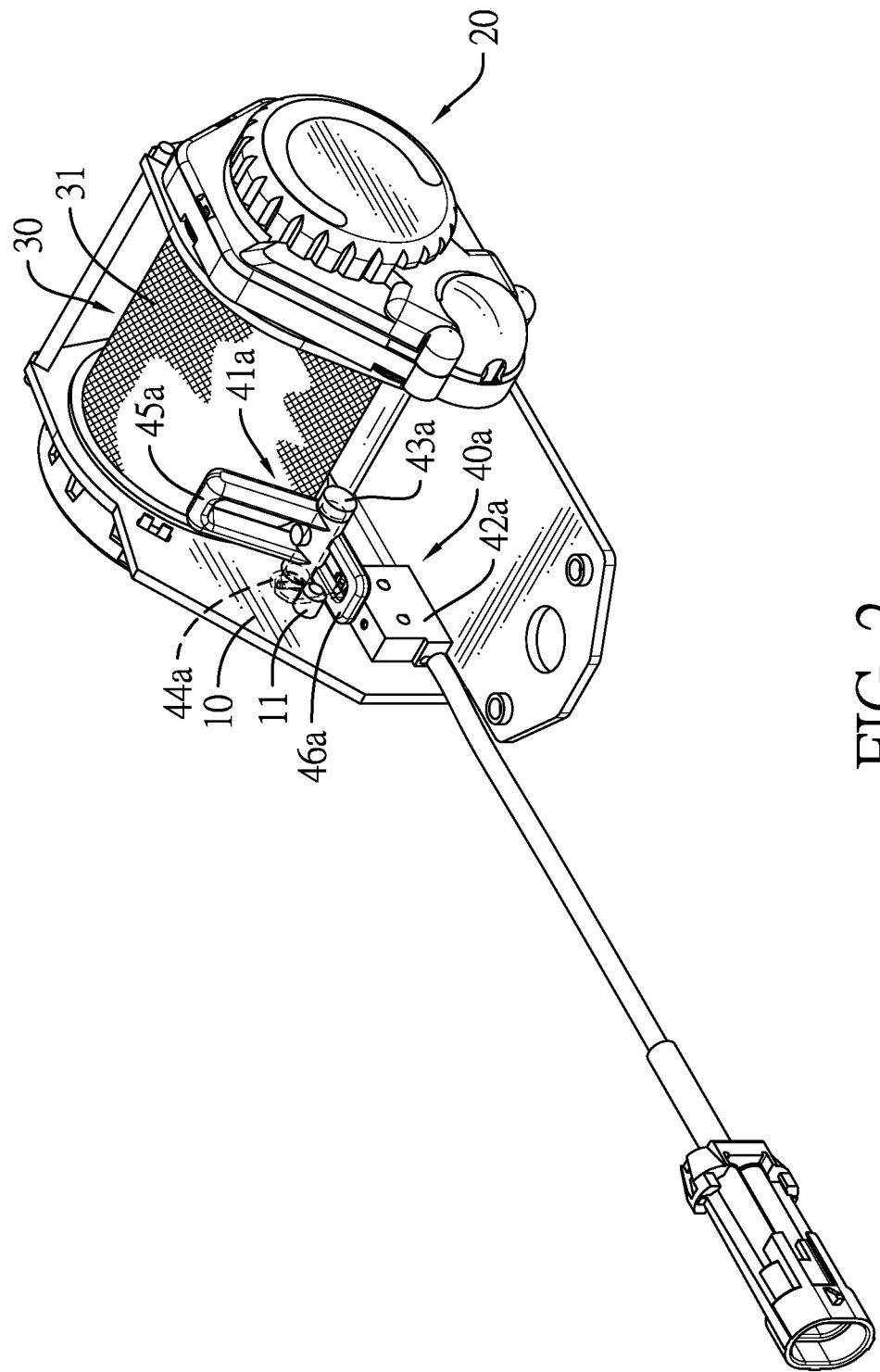
FIG. 2 is another perspective view of the seat belt retractor in FIG. 1.

With reference to FIGS. 1 and 2, a first embodiment of a seat belt retractor in accordance with the present invention comprises a frame 10, a retracting device 20, and a detection device 40*a*.

Figure 3:
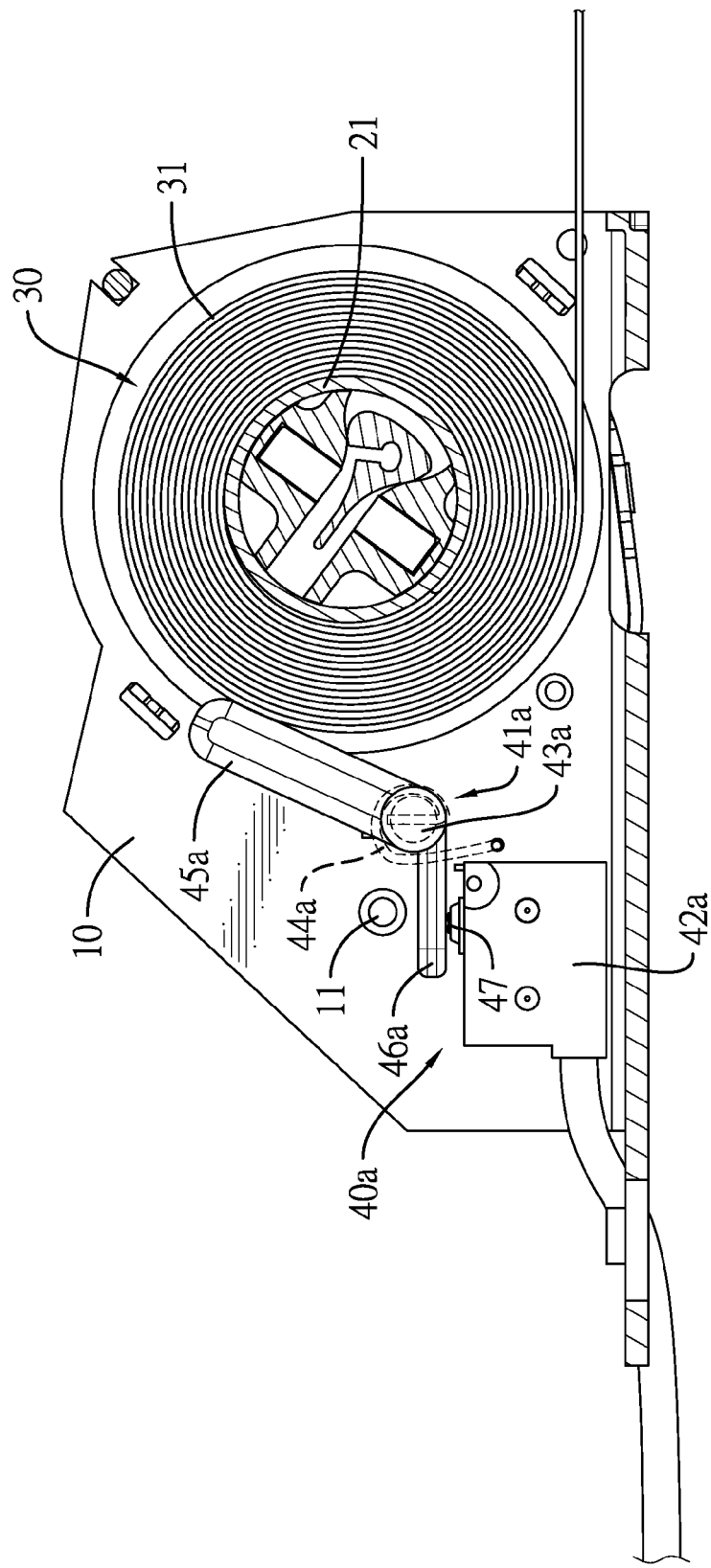
FIG. 3 is an operational side view in partial section of the seat belt retractor in FIG. 1, showing a webbing body is un-pulled.

With reference to FIGS. 1 and 2, in the first embodiment of the seat belt retractor, the frame 10 may be U-shaped and has a bottom and two opposite sides. The retracting device 20 is transversally mounted on the frame 10 and is above the bottom of the frame 10, is rotatably connected to the two opposite sides of the frame 10, and has a spool 21 and a webbing body 30. The spool 21 is pivotally connected to the two opposite sides of the frame 10. With reference to FIG. 3, the webbing body 30 is wound on the spool 21 between the two opposite sides of the frame 10 to form multiple webbing layers 31 around the spool 21 above the bottom of the frame 10.

The detection device 40a is mounted on the frame 10 and has a detecting rod 41a. The detecting rod 41a is restorable, abuts an outermost webbing layer 31 around the spool 21, and produces a displacement according to the variation in quantity of the webbing layers 31.

With reference to FIGS. 1 to 4, the detection device 40a has a micro switch 42a mounted on the bottom of the frame 10. The detecting rod 41a has a shaft 43a, a torsion spring 44a, a first rod portion 45a, and a second rod portion 46a. The shaft 43a is rotatably connected to one of the two opposite sides of the frame 10 and has an outer end extending out of said one of the two opposite sides of the frame 10. The torsion spring 44a is mounted around the outer end of the shaft 43a. The first rod portion 45a is formed on the shaft 43a between the two opposite sides of the frame 10 and abuts the outermost webbing layer 31 around the spool 21. The second rod portion 46a is above the micro switch 42a and formed on, and protrudes from the shaft 43a. The second rod portion 46a selectively actuates the micro switch 42a. An angle is formed between the second rod portion 46a and the first rod portion 45a.

Figure 4:
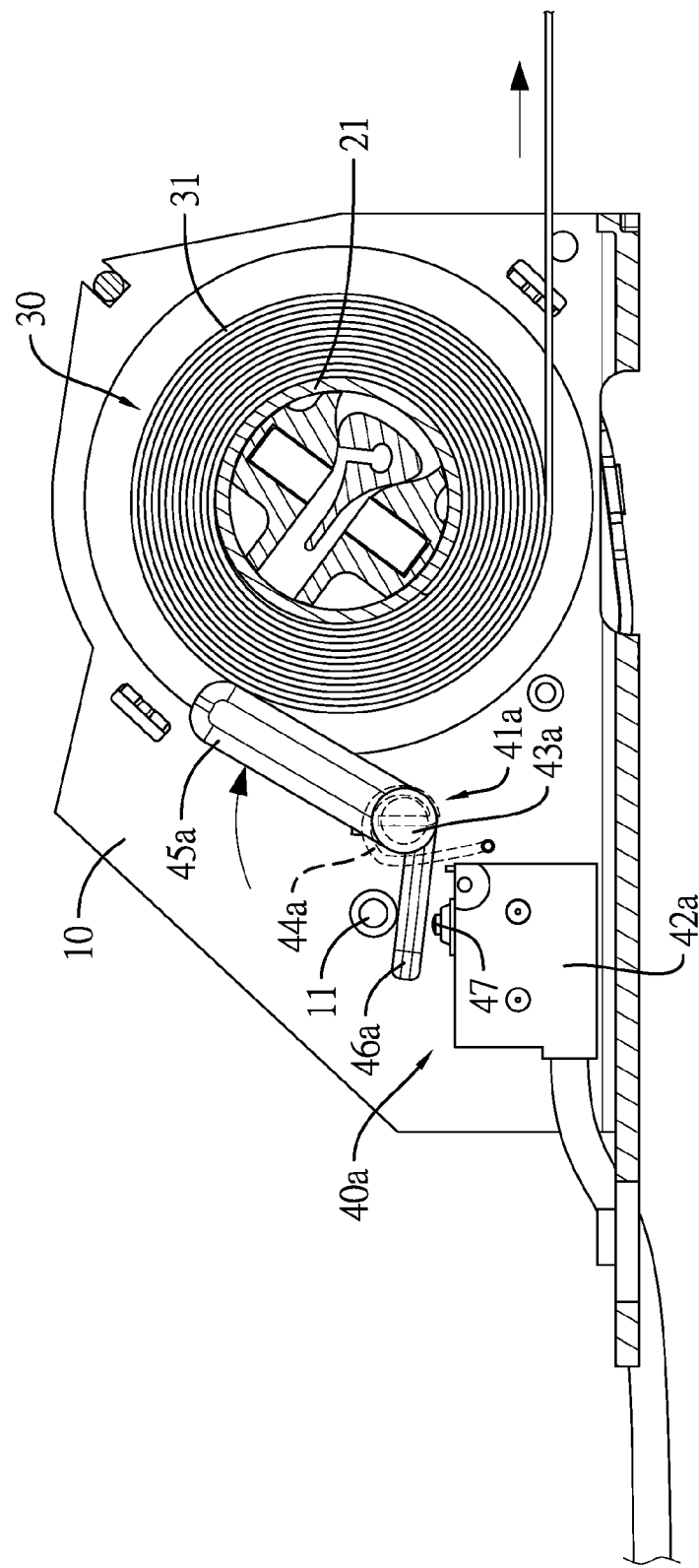
FIG. 4 is an operational side view of the seat belt retractor in FIG. 1, showing a webbing body is pulled.
Figure 5:
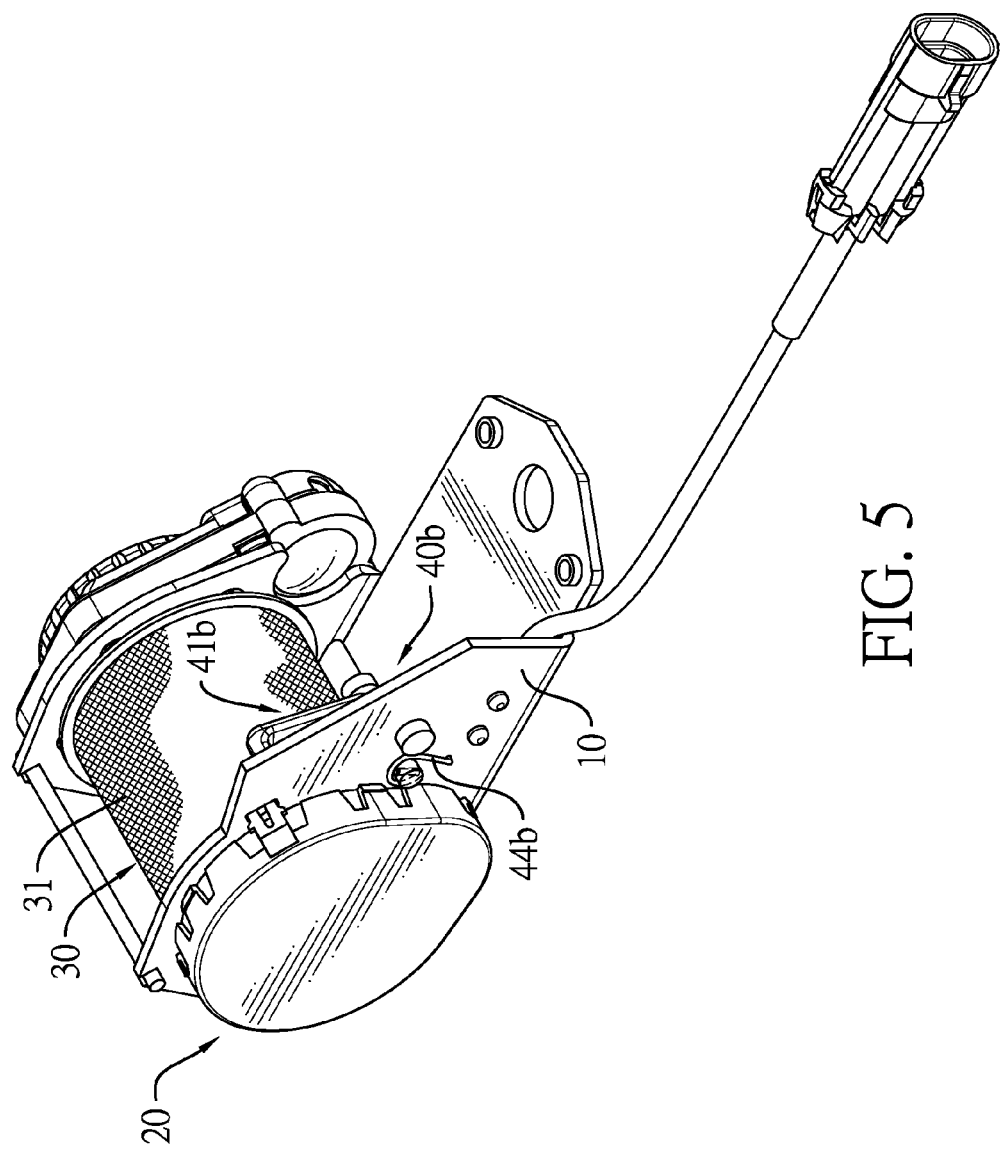
FIG. 5 is a perspective view of a second embodiment of a seat belt retractor in accordance with the present invention.
Figure 6:
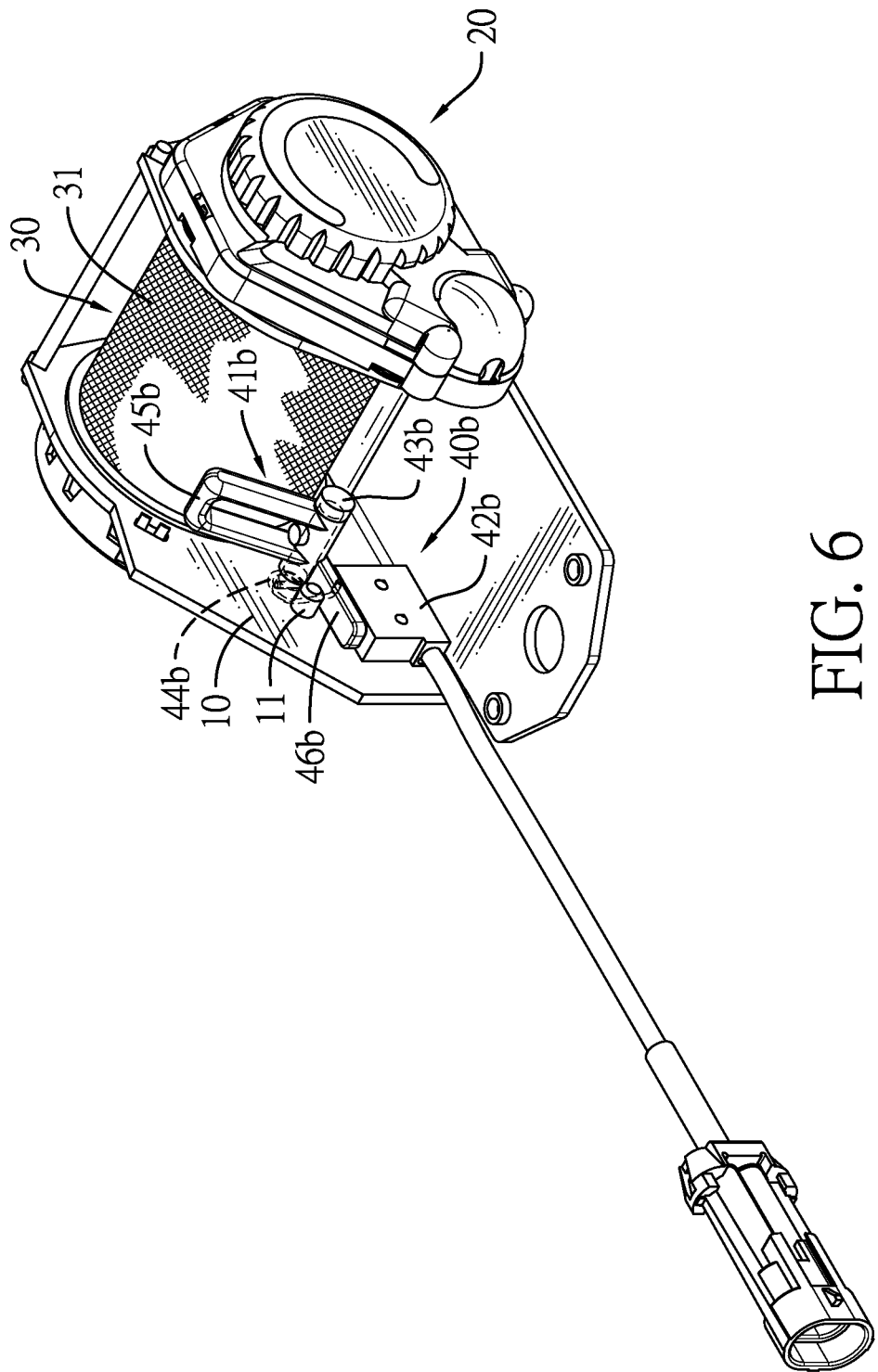
FIG. 6 is another perspective view of the seat belt retractor in FIG. 5.

With reference to FIGS. 3 and 4, a user can pull out the webbing body 30 that is wound on the spool 21 of the seat belt retractor, and the layer number of the webbing layers 31 is reduced. The first rod portion 45a still abuts an outermost webbing layer 31 around the spool 21. The detecting rod 41a is rotated in a clockwise direction and the second rod portion 46a is also rotated in a clockwise direction. When the webbing body 30 is pulled out of the seat belt retractor for a certain length, the layer number of the webbing layers 31 is reduced to a certain degree. The second rod portion 46a is disengaged from an actuating button 47 of the micro switch 42a, and a signal generated by the micro switch 42a is sent to a controller of a vehicle.

If the user does not fasten a seat belt, the webbing body 30 is not pulled out or the pulled length of the webbing body 30 is inadequate. The second rod portion 46a still abuts the actuating button 47 of the micro switch 42a, and then another signal generated by the micro switch 42a is sent to the controller of the vehicle. Then, a light or a sound generated by the vehicle can remind the user to fasten the seat belt. If the webbing body 30 is pulled by the user, the second rod portion 46a is disengaged from the actuating button 47 of the micro switch 42a. The light or the sound generated by the vehicle can be stopped.

With reference to FIGS. 5 to 8, in a second embodiment of a seat belt retractor in accordance with the present invention, the detection device 40b has a magnetic reed switch 42b mounted in the frame 10. The detecting rod 41b has a shaft 43b, a torsion spring 44b, a first rod portion 45b, and a second rod portion 46b. The shaft 43b is rotatably connected to one of the two opposite sides of the frame 10 and has an outer end extending out of said one of the two opposite sides of the frame 10. The torsion spring 44b is mounted around the outer end of the shaft 43b. The first rod portion 45b is formed on the shaft 43b and abuts the outermost webbing layer 31 around the spool 21. The second rod portion 46b is above the magnetic reed switch 42b and formed on, and protrudes from the shaft 43b and selectively actuates the magnetic reed switch 42b. An angle is formed between the second rod portion 46b and the first rod portion 45b.

Figure 7:
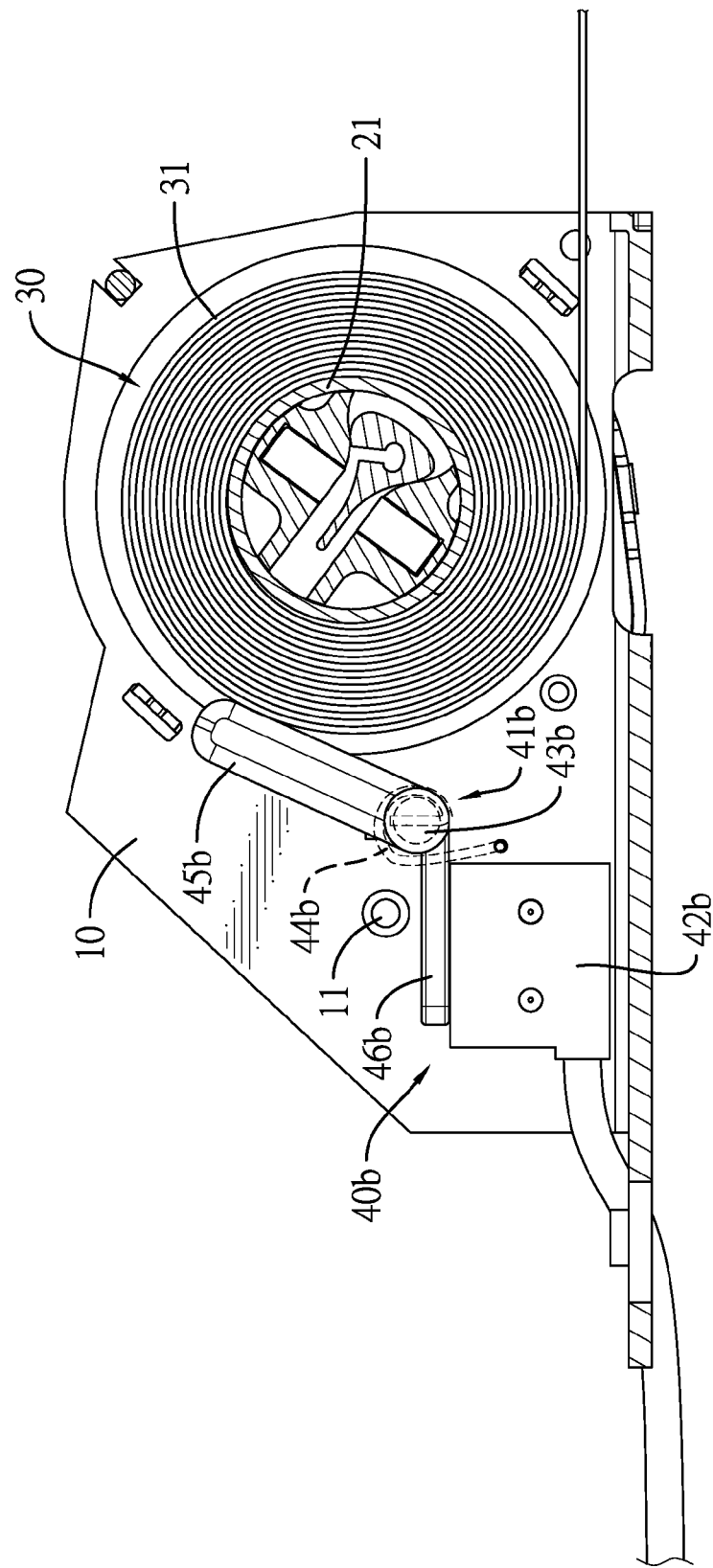
FIG. 7 is an operational side view in partial section of the seat belt retractor in FIG. 5, showing a webbing body is un-pulled.
Figure 8:
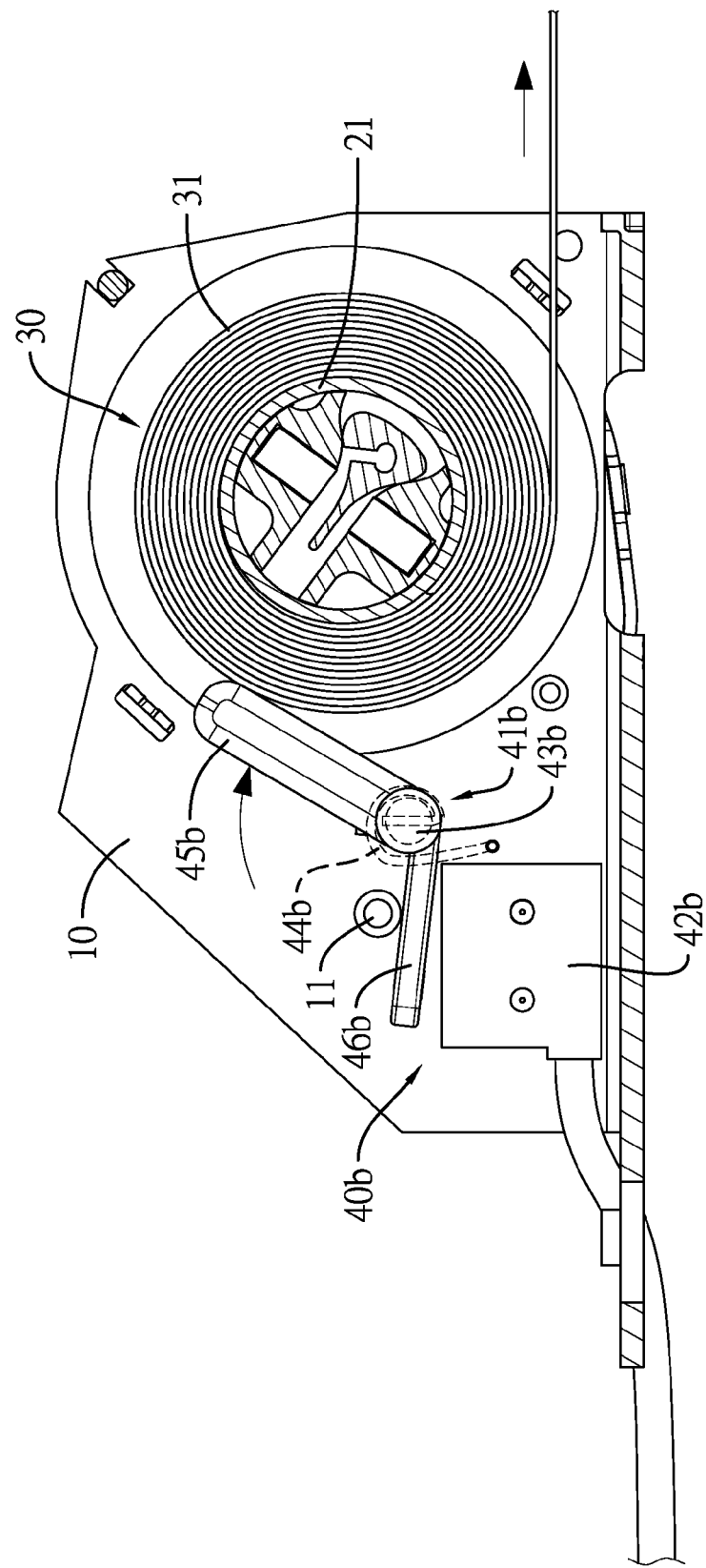
FIG. 8 is an operational side view in partial section of the seat belt retractor in FIG. 5, showing a webbing body is pulled.
Figure 9:
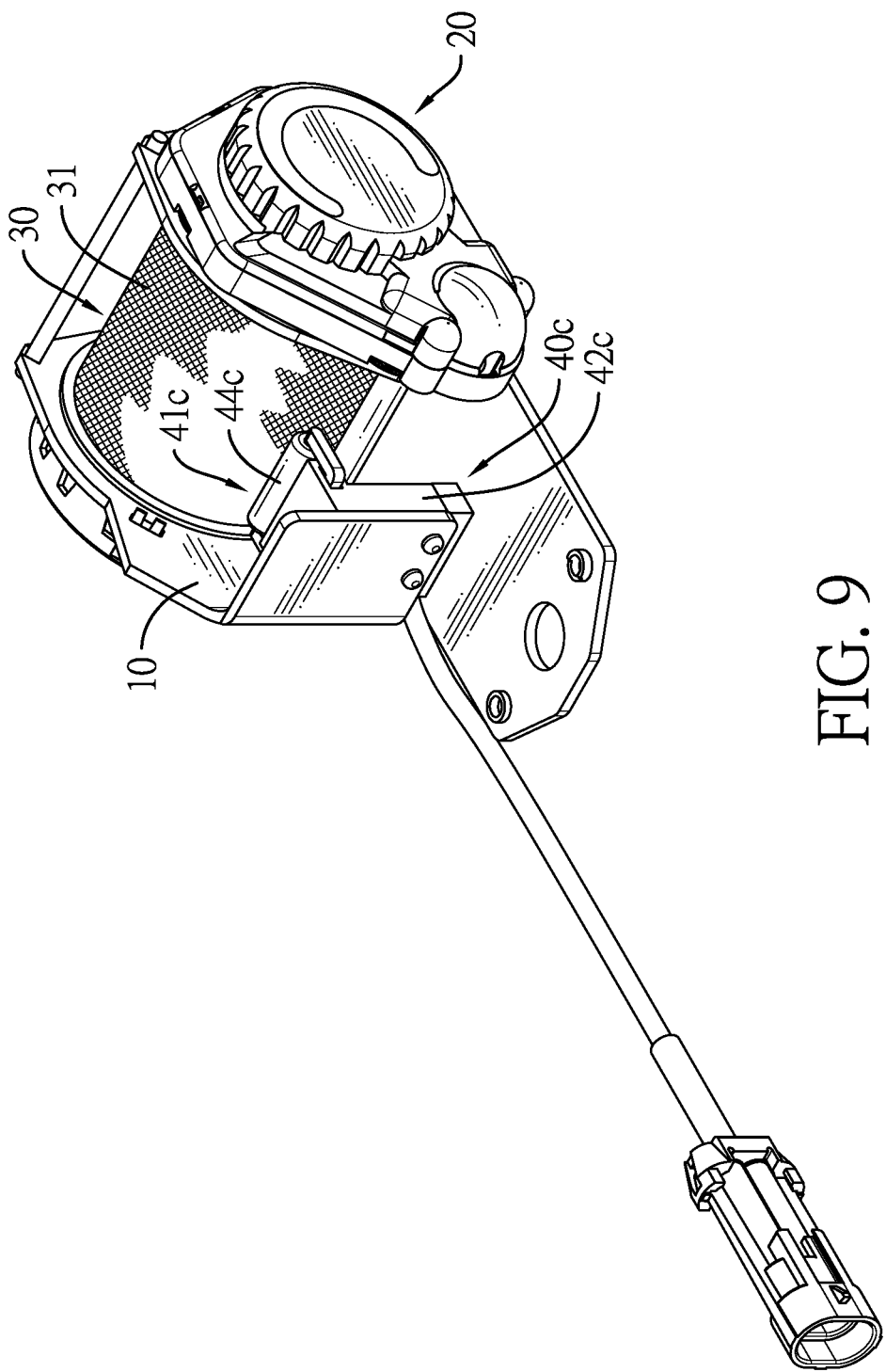
FIG. 9 is a perspective view of a third embodiment of a seat belt retractor in accordance with the present invention.
Figure 10:
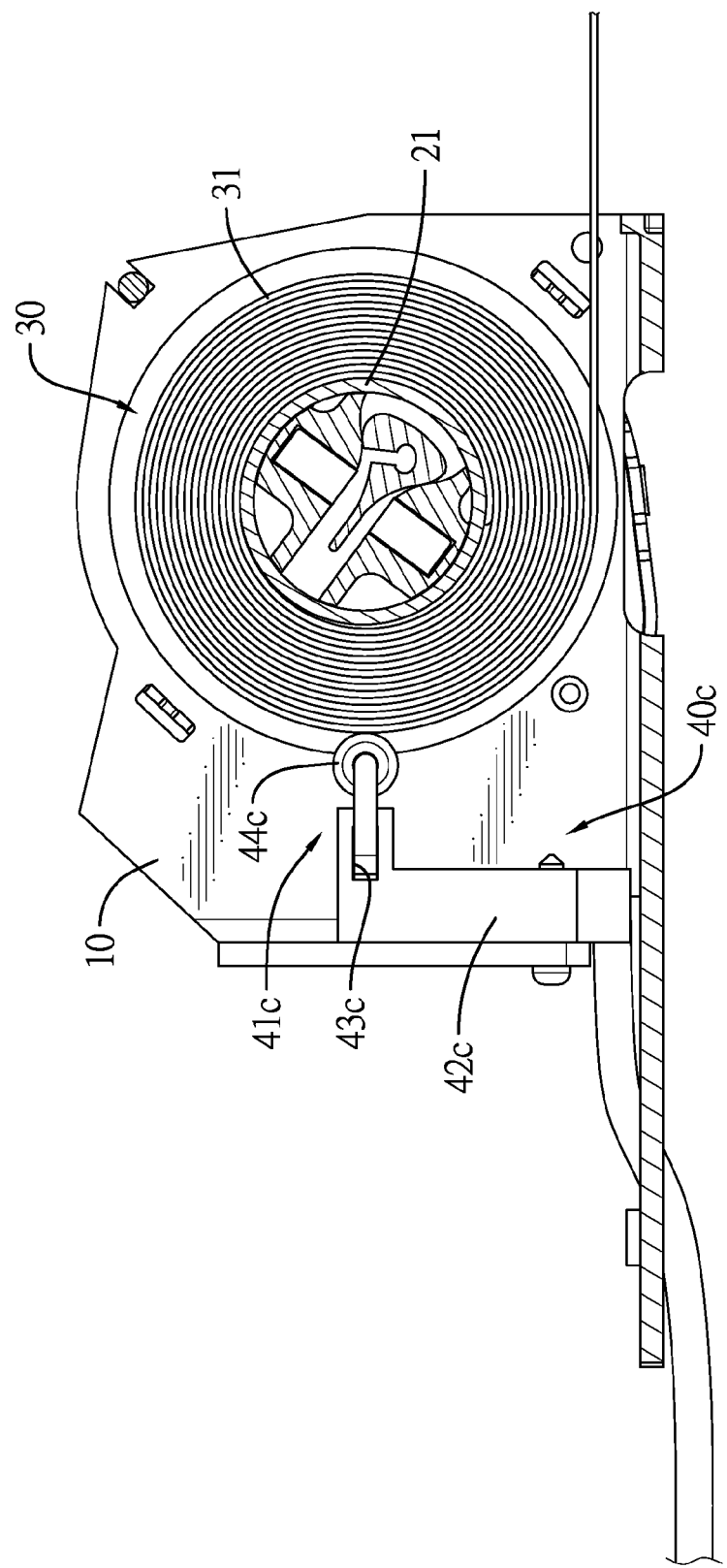
FIG. 10 is a side view in partial section of the seat belt retractor in FIG. 9.
Figure 11:
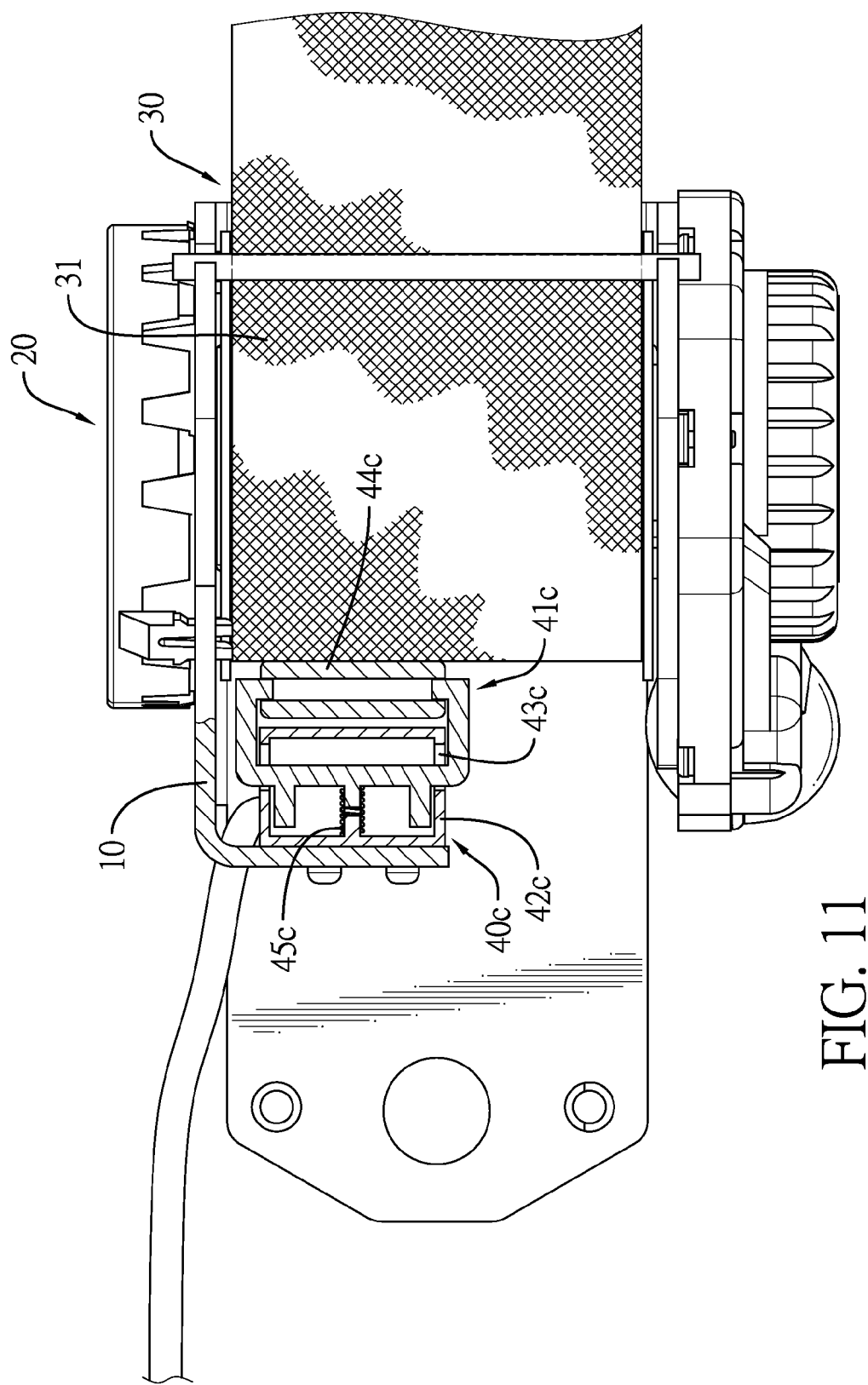
FIG. 11 is a top view of the seat belt retractor in FIG. 9.
Figure 12:
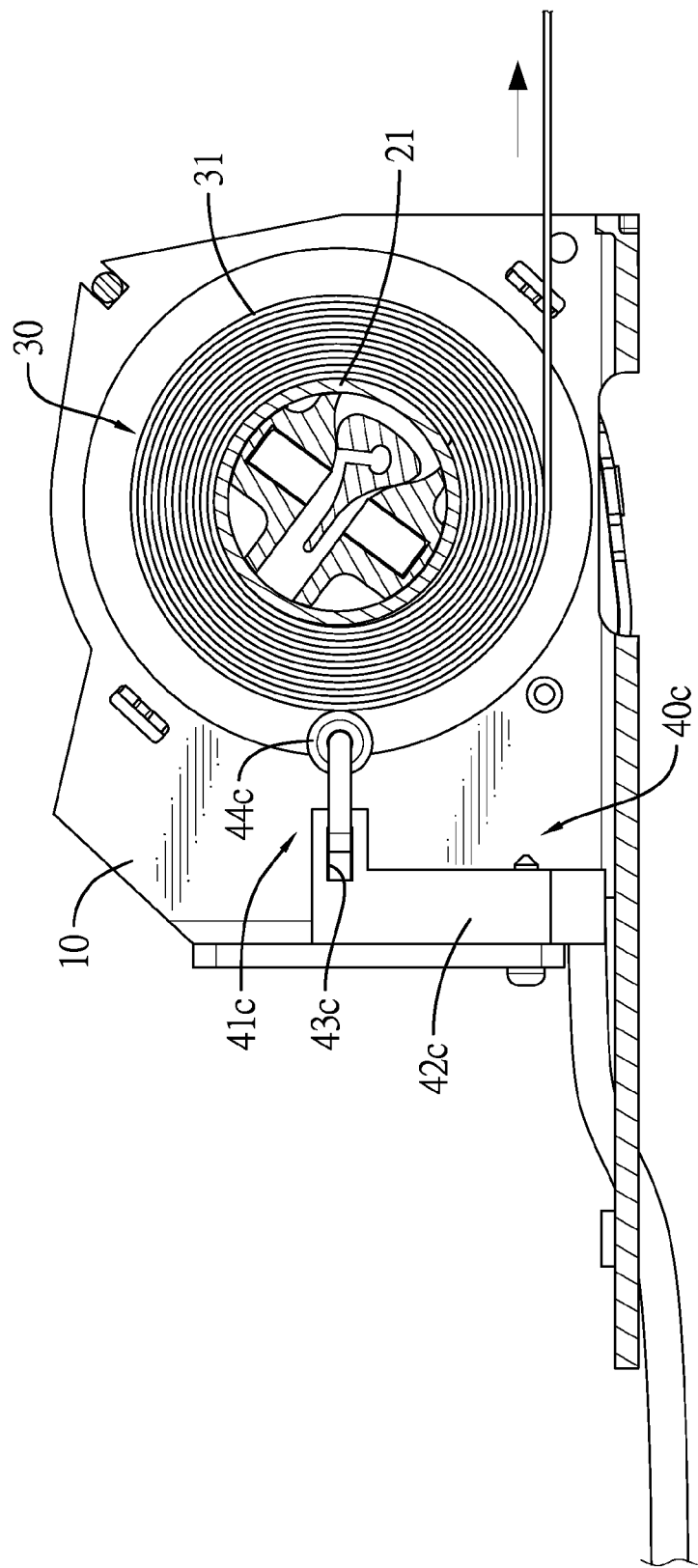
FIG. 12 is a side view of the seat belt retractor in FIG. 9, showing a webbing body is pulled.
Figure 13:
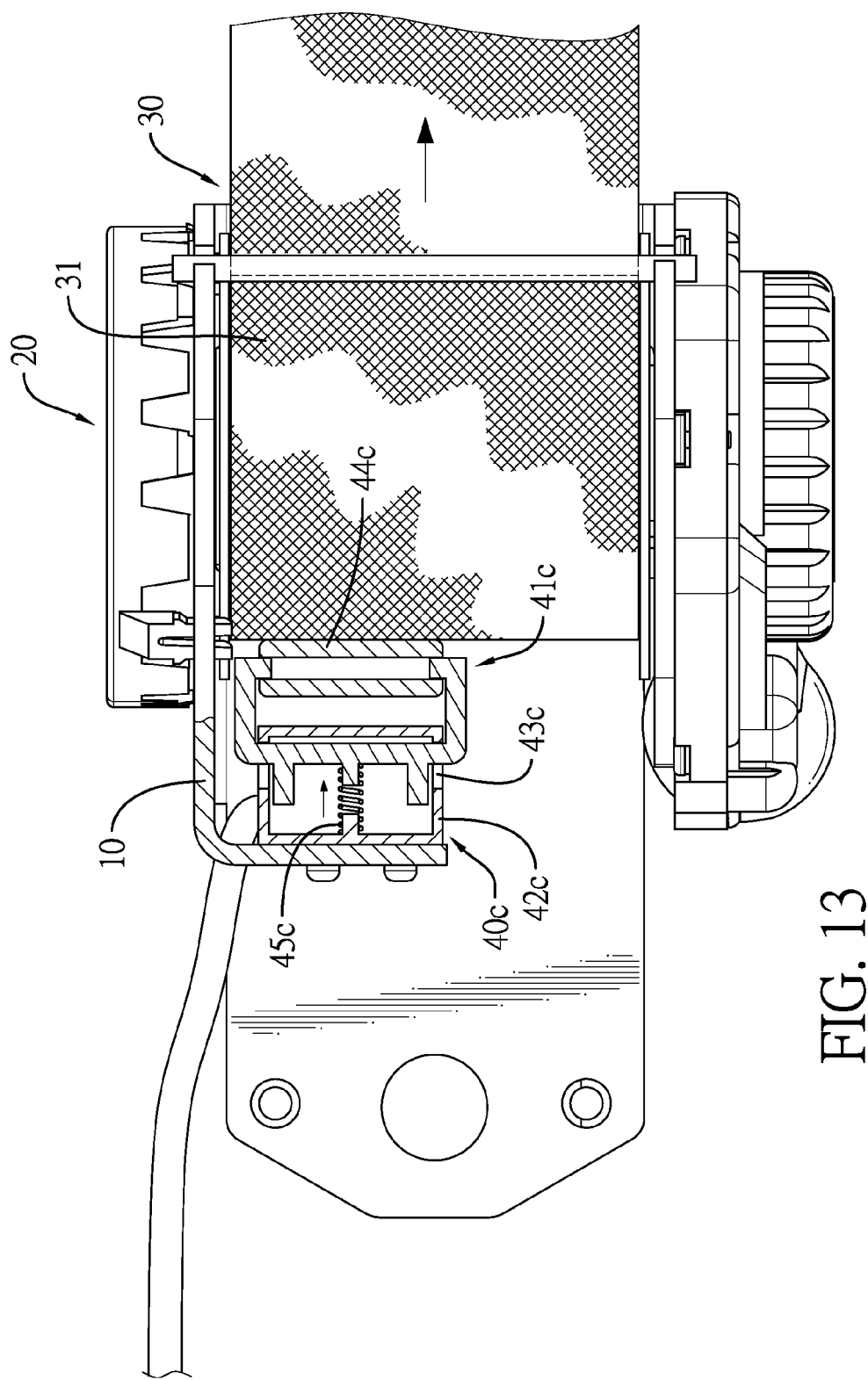
FIG. 13 is a top view of the seat belt retractor in FIG. 9, showing a webbing body is pulled.

With reference to FIGS. 7 and 8, if the user does not fasten the seat belt, the webbing body 30 is not pulled out or the pulled length of the webbing body 30 is inadequate. The layer number of the webbing layers 31 remains unchanged or is not reduced enough. The second rod portion 46b still abuts the magnetic reed switch 42b, and a signal generated by the magnetic reed switch 42b is sent to the controller of the vehicle. The vehicle gives off an alarm to remind the user to fasten the seat belt. If the webbing body 30 is pulled out by the user and the user already fastens the seat belt, the pulled length of the webbing body 30 is adequate, and the layer number of the webbing layers 31 is reduced enough. The first rod portion 45b still abuts one of the webbing layers 31. The detecting rod 41b is rotated in a clockwise direction. The second rod portion 46b is rotated in a clockwise direction and is disengaged from the magnetic reed switch 42b. Another signal generated by the magnetic reed switch 42b is sent to the controller of the vehicle for stopping the alarm given off by the vehicle.

With reference to FIGS. 3 and 7, in the first and second embodiments of the seat belt retractor in accordance with the present invention, the frame 10 of the seat belt retractor has a protrusion 11. The protrusion 11 is mounted on the frame 10 and is above the second rod portion 46a, 46b. The protrusion 11 is to position the second rod portion 46a, 46b.

With reference to FIGS. 9 to 13, in a third embodiment of a seat belt retractor in accordance with the present invention, the detection device 40c has a casing 42c, a chamber, two sliding slots 43c, and a restoring element 45c. The casing 42c is mounted on the frame 10 and has two opposite sidewalls. The chamber is formed in the casing 42c. The sliding slots 43c are elongated, are respectively formed through the two opposite sidewalls of the casing 42c, and communicate with the chamber. The detecting rod 41c is moveably connected to the casing 42c along the sliding slots 43c and has a pushing portion 44c. The pushing portion 44c is mounted on the detecting rod 41c outside the casing 42c and abuts an outermost webbing layer 31 around the spool 21. The restoring element 45c is a spring, is mounted in the casing 42c, and abuts the casing 42c and the detecting rod 41c.

With reference to FIGS. 10 to 13, if the user fastens the seat belt, the webbing body 30 is pulled out and the layer number of the webbing layers 31 is reduced. The pushing portion 44c pushed by the restoring element 45c is moved along the sliding slots 43c and still abuts the webbing body 30. The pushing portion 44c moves for an adequate displacement. The detection device 40c sends a signal to the controller of the vehicle. If the user does not fasten the seat belt, the pushing portion 44c does not move for an adequate displacement. Another signal generated by the detection device 40c is sent to the controller of the vehicle. The vehicle gives off an alarm to remind the user to fasten the seat belt.

Figure 14:
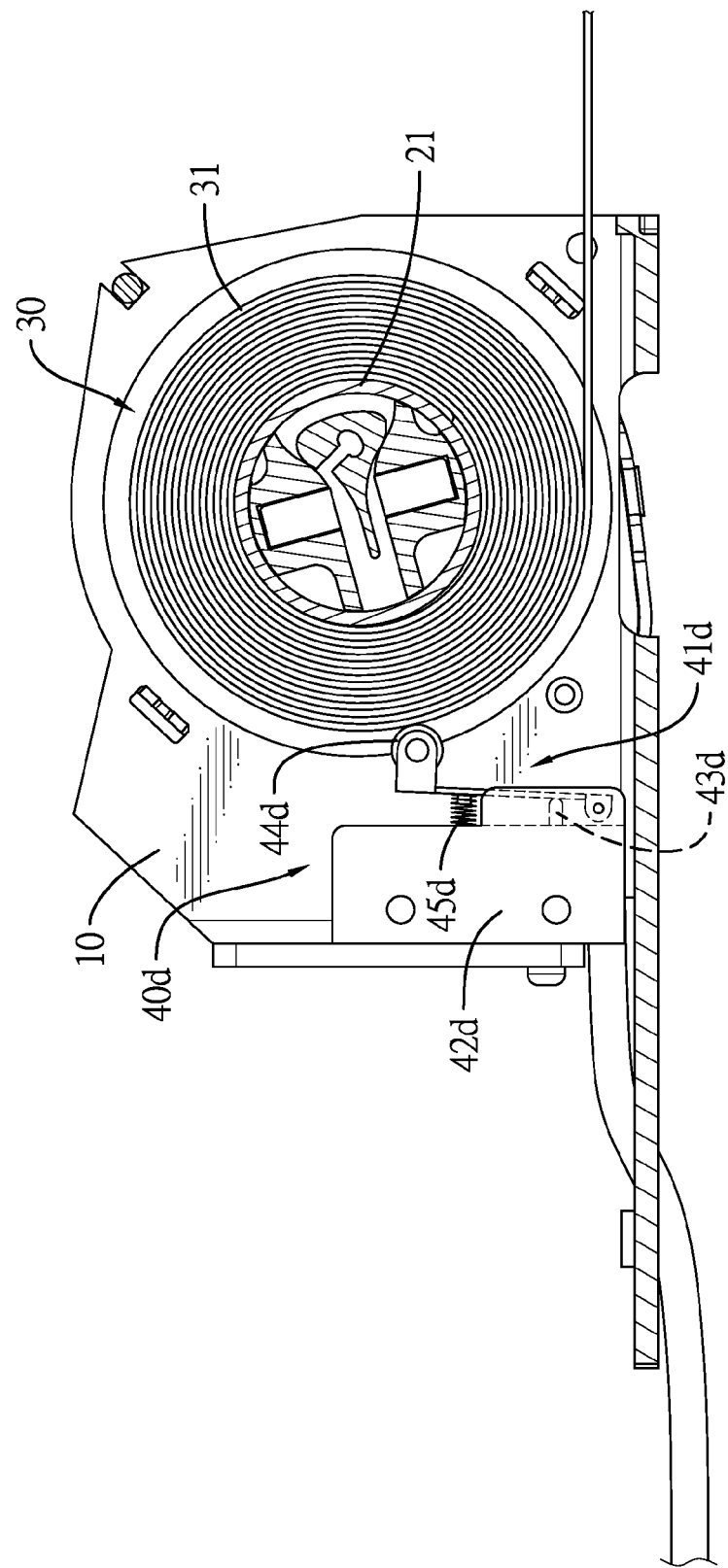
FIG. 14 is a side view in partial section of a fourth embodiment of a seat belt retractor in accordance with the present invention.

With reference to FIG. 14, in a fourth embodiment of a seat belt retractor in accordance with the present invention, the detection device 40d has a seat 42d, a button 43d, and a compression spring 45d. The seat 42d is mounted on the bottom of the frame 10 and has an inner side facing the webbing body 30. The button 43d is mounted on the inner side of the seat 42d. The detecting rod 41d is pivotally connected to the inner side of the seat 42d and has a first end, a second end, and a pressing portion 44d. The first end of the detecting rod 41d is pivotally connected to the seat 42d. The second end of the detecting rod 41d is opposite to the first end. The pressing portion 44d is mounted on the second end and abuts an outermost webbing layer 31 around the spool 21. The detecting rod 41d selectively actuates the button 43d. The compression spring 45d is mounted between the seat 42d and the detecting rod 41d.

With reference to FIG. 14, if the user fastens the seat belt, the webbing body 30 is pulled out, and the layer number of the webbing layers 31 is reduced. The pressing portion 44d is rotated in a clockwise direction and still abuts the webbing body 30. The detecting rod 41d is disengaged from the button 43d of the seat 42d. A signal generated by the detection device 40d is sent to the controller of the vehicle that user has fasten the seat belt. If the user does not fasten the seat belt, the detection device 40d sends another signal to the controller of the vehicle, and then the vehicle gives off an alarm to remind the user to fasten the seat belt.

Figure 15:
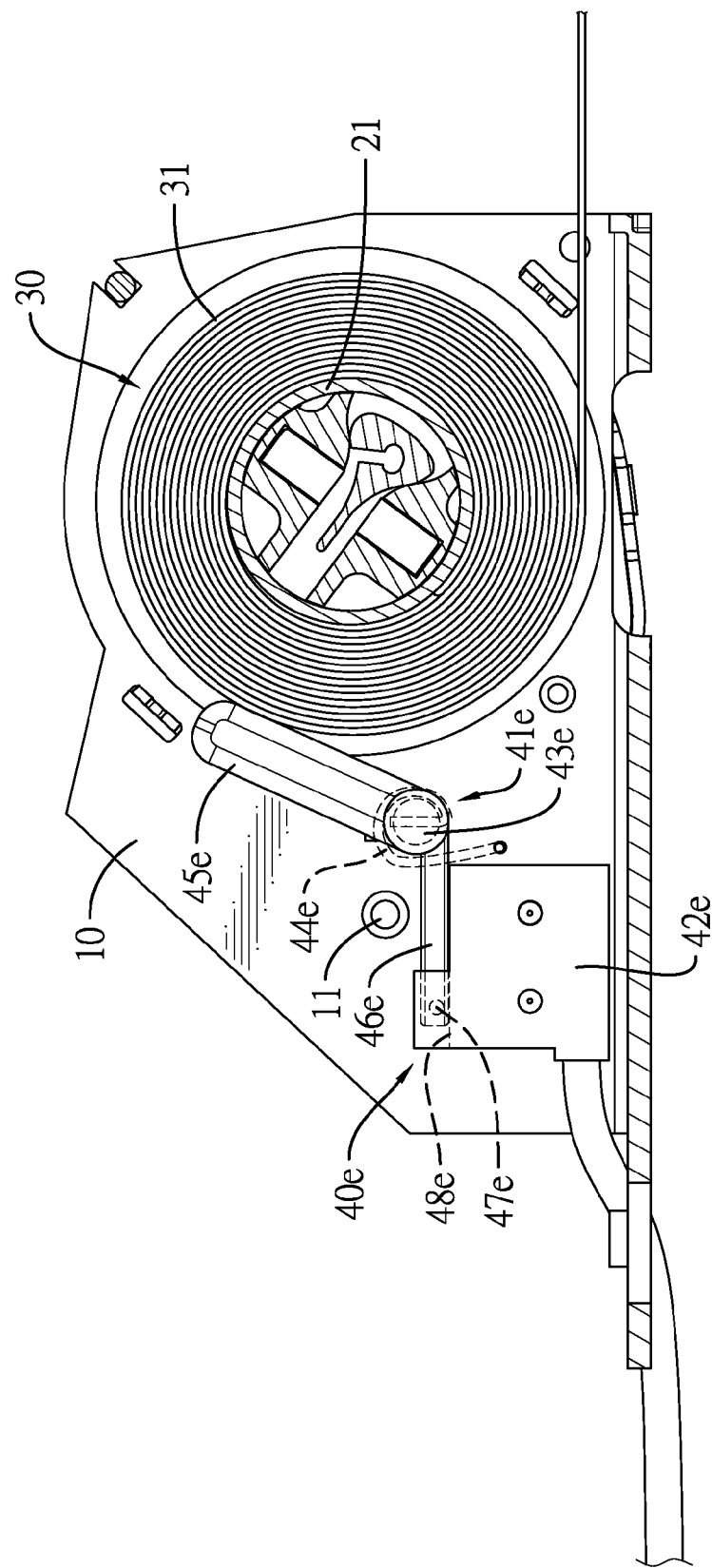
FIG. 15 is a side view in partial section of a fifth embodiment of a seat belt retractor in accordance with the present invention.
Figure 16:
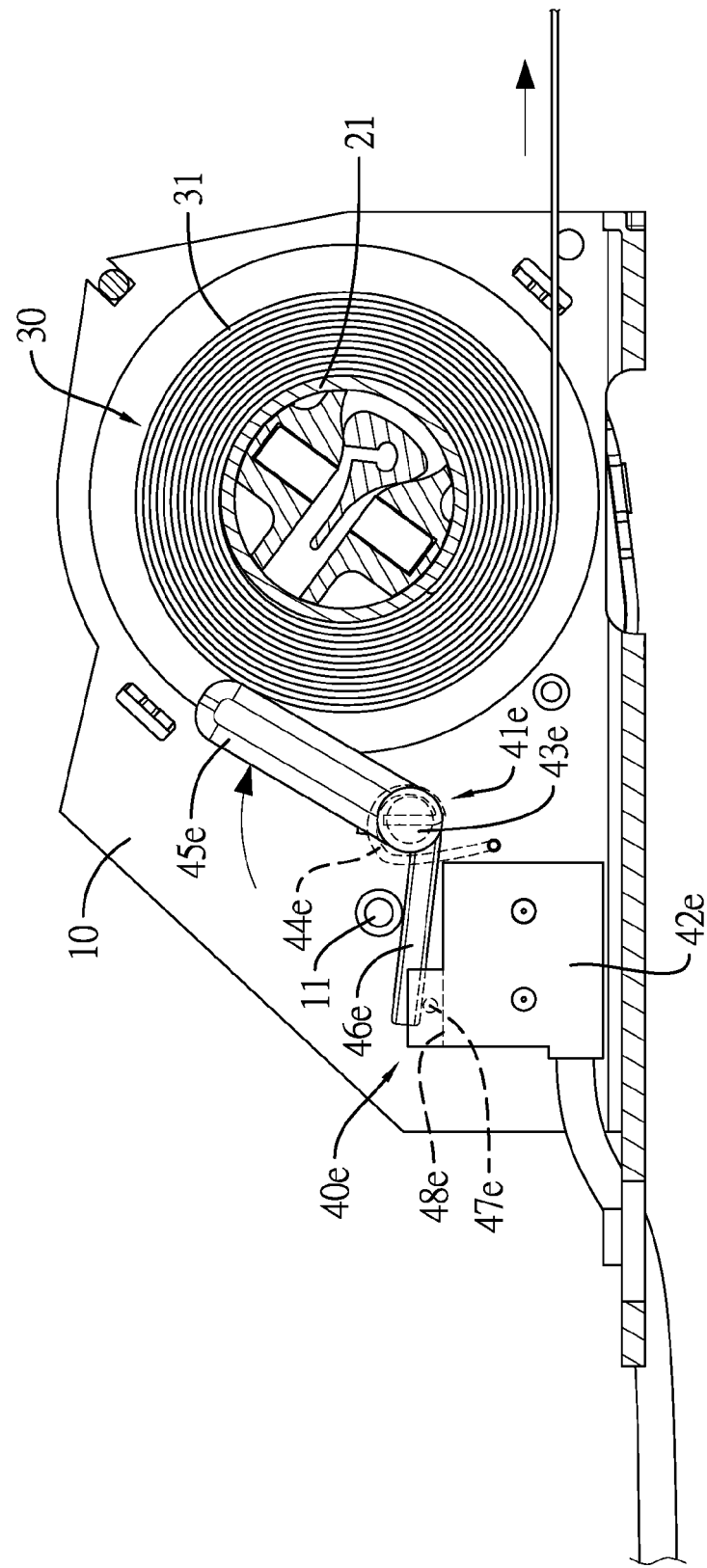
FIG. 16 is an operational side view in partial section of the seat belt retractor in FIG. 15, showing a webbing body is pulled.

With reference to FIGS. 15 and 16, in a fifth embodiment of a seat belt retractor in accordance with the present invention, the detection device 40e has a safety switch 42e. The safety switch 42e is mounted in the frame 10 and has a top, a sensing slot 48e, and two sensing spots 47e. The sensing slot 48e is transversally formed through the top of the safety switch 42e and has two opposite inner sides. The sensing spots 47e are respectively mounted on the opposite inner sides of the sensing slot 48e and face each other. The detecting rod 41e has a shaft 43e, a torsion spring 44e, a first rod portion 45e, and a second rod portion 46e. The shaft 43e is rotatably connected to one of the two opposite sides of the frame 10 and has an outer end extending out of said one of the two opposite sides of the frame 10. The torsion spring 44e is mounted around the outer end of the shaft 43e. The first rod portion 45e is formed on the shaft 43e and abuts an outermost webbing layer 31 around the spool 21. The second rod portion 46e is formed on and protrudes from the shaft 43e, is selectively inserted into the sensing slot 48e, and selectively actuates and deactivates the sensing spots 47e of the safety switch 42e. An angle is formed between the second rod portion 46e and the first rod portion 45e.

With reference to FIG. 15, if the user does not fasten the seat belt, the first rod portion 45e abuts the webbing body 30. The second rod portion 46e is inserted into the sensing slot 48e of the safety switch 42e and is located between the two sensing spots 47e. The two sensing spots 47e are blocked by the second rod portion 46e. A signal generated by the safety switch 42e is sent to the controller of the vehicle, and the vehicle gives off an alarm to remind the user to fasten the seat belt. If the user fastens the seat belt, the webbing body 30 is pulled out. The first rod portion 45e still abuts the webbing body 30 and is rotated. The second rod portion 46e is rotated, too. The two sensing spots 47e face each other and are not blocked by the second rod portion 46e. The safety switch 42e sends another signal to the controller of the vehicle that the user already fastens the seat belt. Therefore, the vehicle does not give off the alarm.

Accordingly, the detecting rod 41a, 41b, 41c, 41d, 41e of the detection device 40a, 40b, 40c, 40d, 40e can detect a pulled length of the webbing body 30 to know whether the user fastens the seat belt or not. If the user does not fasten the seat belt, the detection device 40a, 40b, 40c, 40d, 40e can send the signal to the controller of the vehicle, and the vehicle can give off the alarm to remind the user to fasten the seat belt for enhancing the safety.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A seat belt retractor comprising:
    a frame having a bottom and two opposite sides;
    a retracting device transversely mounted on the frame and having a spool pivotally connected to the frame;
        a webbing body wound on the spool and forming multiple webbing layers around the spool;
    a detection device mounted on the frame and having
        a micro switch mounted on the bottom of the frame;
        a detecting rod being restorable, the detecting rod abutting an outermost webbing layer around the spool and generating a displacement according to the variation in quantity of the webbing layers,
        a shaft rotatably connected to one of the two opposite sides of the frame and having an outer end extending out of said one of the two opposite sides of the frame;
        a torsion spring mounted around the outer end of the shaft;
        a first rod portion formed on the shaft between the two opposite sides of the frame and abutting the outermost webbing layer around the spool; and
        a second rod portion above the micro switch and formed on, and protruding from the shaft, the second rod portion selectively actuating the micro switch.

2. The seat belt retractor as claimed in claim 1, wherein the frame of the seat belt retractor has a protrusion mounted on the frame, and the protrusion is above the second rod portion.

* * * * *